US008755771B2

(12) United States Patent
Miyazaki (10) Patent No.: US 8,755,771 B2
(45) Date of Patent: Jun. 17, 2014

(54) SYSTEM, METHOD, AND PROGRAM FOR GENERATING SCREEN

(75) Inventor: Yoshinori Miyazaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/451,028

(22) Filed: Apr. 19, 2012

(65) Prior Publication Data

US 2012/0302210 A1 Nov. 29, 2012

(30) Foreign Application Priority Data

May 26, 2011 (JP) .................................. 2011-118147

(51) Int. Cl.
H04M 1/66 (2006.01)
(52) U.S. Cl.
USPC ......... 455/411; 455/566; 455/414.1; 455/418
(58) Field of Classification Search
USPC ................... 455/566, 411, 414.1, 418, 550.1
See application file for complete search history.

(56) References Cited

FOREIGN PATENT DOCUMENTS

| JP | 2009-163142 A | 7/2009 |
|----|---------------|--------|
| JP | 2010-288243 A | 12/2010 |

*Primary Examiner* — Kathy Wang-Hurst
(74) *Attorney, Agent, or Firm* — Foley & Lardner LLP (57) ABSTRACT

A user terminal provides a screen with favorable usability according to the terminal used by a user at low cost. Information apparatus 100 executes a process of distinguishing an access source terminal type with at least one information, acquired when accessing from a user terminal, of user agent information relating to the user terminal and communication carrier information used for the accessing, and a process of generating, when the distinguished terminal type is a mobile phone, an inline CSS style screen display information by reading screen decoration data for mobile phones from a storage to include in the screen definition and when the distinguished terminal type is a smartphone or a tablet PC, an external CSS file format screen display information by reading screen decoration data for smartphones or tablet PCs from the storage to include in the screen definition.

6 Claims, 5 Drawing Sheets

SYSTEM, METHOD, AND PROGRAM FOR GENERATING SCREEN

CROSS-REFERENCE TO RELATED APPLICATIONS

The present application claims priority upon Japanese Patent Application No. 2011-118147 filed on May 26, 2011, which is herein incorporated by reference.

BACKGROUND

1. Technical Field

The present invention relates to a system for generating a screen, a method for generating a screen and a program for generating a screen. In particular, the invention relates to a technology that effectively provides a screen with favorable usability depending on the terminal used by a user at low cost.

2. Related Art

A variety of types of terminals used for accessing the Internet is in a growing trend from early personal computers, mobile phones and to smartphones. There are cases where various specifications and protocols used among the terminal types vary and therefore screen data and the like for each terminal type has been prepared in advance by the server side for allowing the users to display the screens in a comfortable manner.

As technology for creating screens, there has been proposed for example, information apparatuses, information processing systems, computer programs and information processing methods that enable displaying on screens according to the performance of each terminal device when a terminal device couples to an information apparatus via the network. See for example Japanese Patent Application Laid-open Publication No. 2009-163142.

There has also been proposed a contents generating and delivery system for mobile phones and smartphones, or tablet PCs that utilize contents browsing devices with screens smaller than those of personal computers to allow the contents to be browsed comfortably. Such a system is configured with a step for generating contents, a step for limiting the display duration of the generated contents, a step for displaying a part of the generated contents in a zoomable manner, a step for taking over session information, and a step for converting contents to transmit the contents via the Internet. See for example Japanese Patent Application Laid-open Publication No. 2010-288243.

Recently, market share for smartphones have been increasing and the demand for dedicated screens that suit the usability of smartphones have been increasing as well. And, if sites were built for each type of terminal as was in the conventional case, separate screens would have to be generated for smartphones in addition to those for other terminals such as PCs and mobile phones thus requiring further effort and cost. But even if PCs screens were used also for smartphone screens, the ease of use for the user would not be favorable.

In other words, when the same screen is displayed on every kind of terminal accessing the Internet, there will be a problem of creating large difference in ease of use between the terminals. On the other hand, if a screen suiting the terminal were generated for each terminal type, there would be a problem that the cost and effort therefor would be enormous.

SUMMARY

Therefore, an object of the present invention is to provide a technology that offers a screen favorable in usability appropriate for each user terminal in an effective manner and at low cost.

The screen generating system according to an aspect of the present invention for solving the above-described problem, includes a communication unit configured to communicate with a user terminal through a network, a storage configured to store at least screen definition data common to various user terminal types, and screen decoration data according to a user terminal type, a processing unit configured to distinguish an access source terminal type with at least one information, acquired when accessing from a user terminal, of user agent information relating to the user terminal and communication carrier information used for the accessing, a processing unit configured to generate, when the distinguished terminal type is a mobile phone, inline CSS style screen display information by reading screen decoration data for mobile phones from the storage to include in the screen definition and when the distinguished terminal type is a smartphone or a tablet PC, external CSS file format screen display information by reading screen decoration data for smartphones or tablet PCs from the storage to include in the screen definition, and an arithmetic unit configured to execute a process that returns the generated screen display information to the user terminal.

Further, the screen generating method according to an aspect of the present invention is a method of generating a screen by an information apparatus including a communication unit configured to communicate with a user terminal through a network and a storage configured to store at least screen definition data common to various user terminal types and screen decoration data according to a user terminal type, including distinguishing an access source terminal type with at least one information, acquired when accessing from a user terminal, of user agent information relating to the user terminal and communication carrier information used for the accessing, generating, when the distinguished terminal type is a mobile phone, an inline CSS style screen display information by reading screen decoration data for mobile phones from the storage to include in the screen definition and when the distinguished terminal type is a smartphone or a tablet PC, an external CSS file format screen display information by reading screen decoration data for smartphones or tablet PCs from the storage to include in the screen definition, and returning the generated screen display information to the user terminal.

Furthermore, the screen generating program according to an aspect of the present invention is a computer-readable recording medium storing a program configured to generate a screen by an information apparatus including a communication unit configured to communicate with a user terminal through a network and a storage configured to store at least screen definition data common to various user terminal types and screen decoration data according to a user terminal type, the program causing the computer to execute a process of distinguishing an access source terminal type with at least one information, acquired when accessing from a user terminal, of user agent information relating to the user terminal and communication carrier information used for the accessing, a process of generating, when the distinguished terminal type is a mobile phone, an inline CSS style screen display information by reading screen decoration data for mobile phones from the storage to include in the screen definition and when the distinguished terminal type is a smartphone or a tablet PC, an external CSS file format screen display information by reading screen decoration data for smartphones or tablet PCs from the storage to include in the screen definition, and a process of returning the generated screen display information to the user terminal.

According to the present invention, there can be provided a screen favorable in usability appropriate for the user's terminal in an effective manner and at low cost.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

- - -System Configuration- - -

Figure 1:
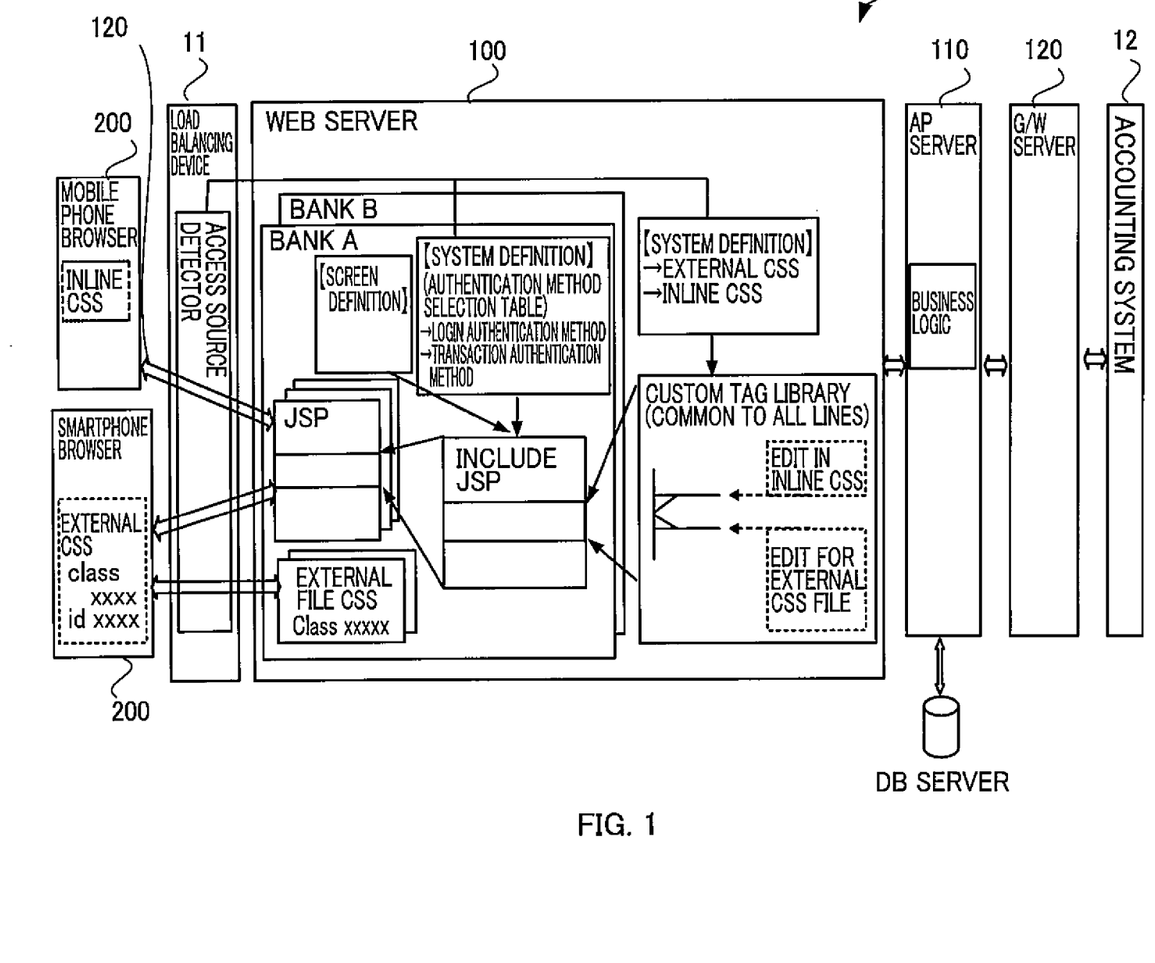
FIG. 1 is a network configuration diagram including the screen generating system of the present embodiment.

A detailed description of an embodiment of the present invention with reference to the drawings will follow. FIG. 1 illustrates a network configuration including a screen generating system 100 of the present embodiment. The Web server 100 being the screen generating system shown in FIG. 1 is a computer system that provides screens with favorable usability according to the terminal of the user effectively and at low cost. An example given here assumes a situation where a user conducts an online banking transaction of a financial institution using a smartphone. Conventionally, such users would have browsed screens for PC sites on smartphones with inconvenience and undue stress. However, such problems would not occur with an online banking system to which the screen generating technology of the present embodiment is applied where a screen that suits the usability of the smartphone can be browsed comfortably. Note that explanation on online banking as above will be given in the present embodiment, however, the subject to which the present invention is applied is not limited hereto and can be applied to any computer system that provides a screen to a user terminal of different types.

In the case where a circumstance such as that described above is assumed the network configuration includes, for example, a sever group 10 that provides services through online banking, a designated load balancing device 11, an accounting system 12 in a financial institution and a user terminal 200.

The server group 10 includes a Web server 100 that receives access from the user terminal 200, an application server 110 that actually executes online banking processes with an accounting system and the like in response to the user's instruction, and a gateway server 120 that mediates secure communication between the aforementioned application severs 110 and the aforementioned accounting system 12 placed in a closed network of a company. As a matter of course, the access target of the user terminal 200 is only the Web server 100. In this way, since the application server 110 that executes business logics and the Web server 100 that provides the screens through interactions with the user terminal 200 are handled separately, the system administrator or the like that manages screen configuration and the like need not perform a business logic, that is, work relating to the application server 110 and is only necessary to deal with screen definition and the tag library in the Web server 100, screen decoration data and the like.

Figure 2:
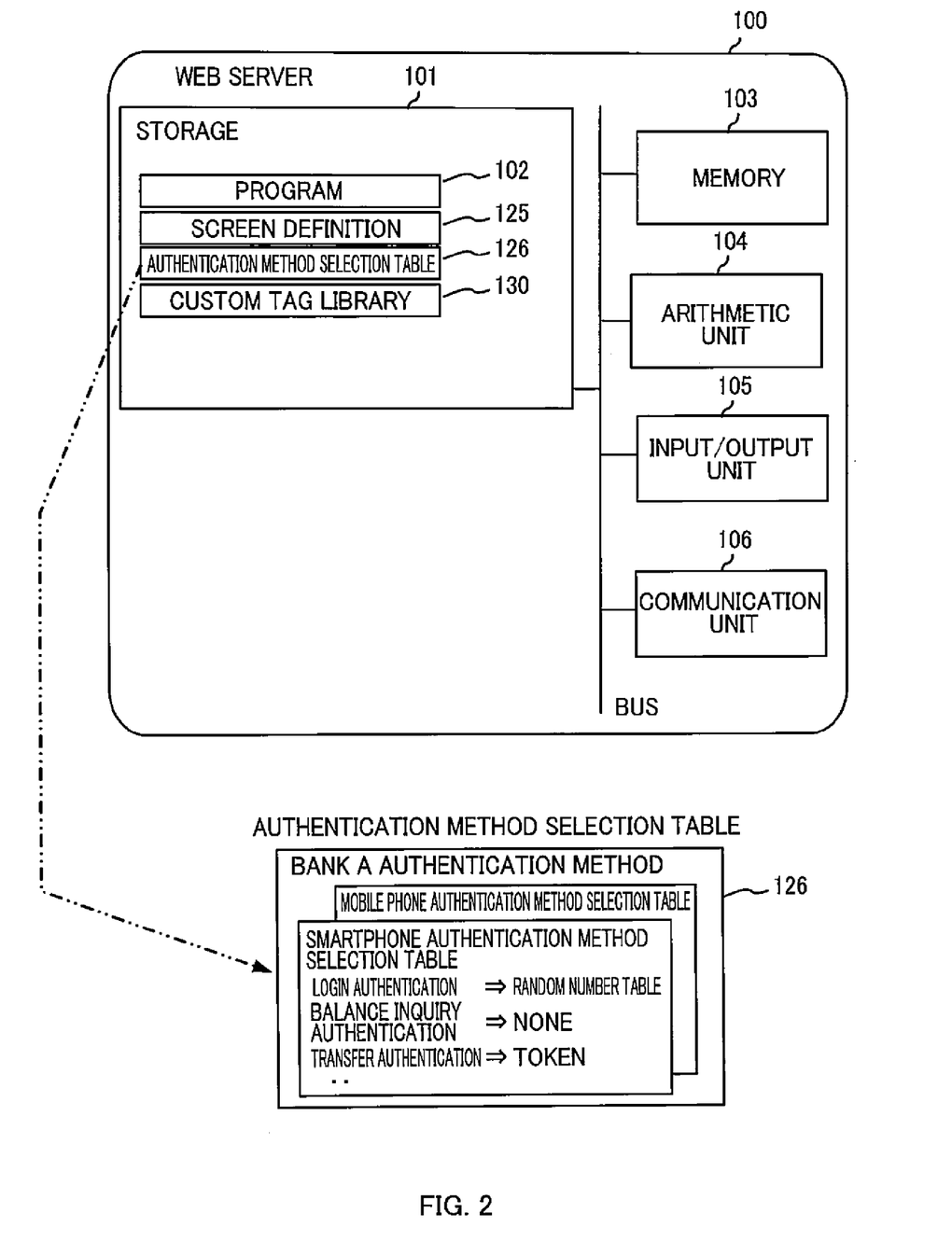
FIG. 2 is a block diagram showing a configuration example of the Web server (screen generating system) in the present embodiment.

FIG. 2 illustrates a configuration example of the Web server (screen generating system) in the present embodiment. Additionally, the hardware configuration of the Web server 100 being the screen generating system is as follows. The Web server 100 includes a storage 101 configured with an appropriate nonvolatile storage device such as a hard disk drive, a memory 103 configured with a volatile storage device such as a RAM, an arithmetic unit 104 such as a CPU that performs integrated control of the device itself by such as reading out programs 102 held in the storage 101 into the memory 103 to be executed as well as performs various decision, operation and control processes, an input/output unit 105 responsible for key input or voice input by a predetermined person in charge or the like, and a communication unit 106 that couples with the network to carry out communication processes with other devices. Note that, the storage 101 stores therein at least a program 102 for implementing functions required by the screen generating system of the present embodiment, a screen definition 125 for various user terminal types, an authentication method selection table 126 that has written therein user authentication methods for smartphones and mobile phones whose security strengths, for example, differ among terminal types as shown in the drawing, and a custom tag library 130 containing screen decoration data and the like for each user terminal type.

Next, functions provided to the Web server 100 being the screen generating system of the present embodiment will be explained. As described above, the following functions explained can be considered as functions implemented by executing programs included in, for example, the Web server 100.

The aforementioned Web server 100 distinguishes the terminal type of the access source using at least one of user agent information relating to the user terminal 200 which is information acquired when accessing from the user terminal 200, or communication carrier information used in the access. This process may be executed as an access source detector by the load balancing device 11 as shown in FIG. 1. The user agent information includes a value in the HTTP header sent in response to the request from a client and is information indicating software or hardware used when the user terminal 200 communicates with the Web server 100 according to a predetermined protocol.

The Web browser is a typical user agent for accessing the Web using HTTP being a typical example of a protocol in the Internet, and the information on the Web browser acts as the user agent information. The web browser often differs with the differences between PCs and mobile phones, difference in communication carriers of mobile phones, date of manufacture of terminals and implemented OS and the like which leads to difference in agent information. The Web server 100 that holds in advance information relating to the correspondence relation between such agent information or communication carrier information, and the type of user terminal 200, becomes capable of determining whether the user terminal 200 is any one of a PC, mobile phone and a smartphone. Further, communication carrier information is information on dedicated lines used by mobile phones for communication and is identified from the access path information of the user terminal 200.

For example, when the user agent information is indicating a Web browser unique to the smartphone, the Web server 100 can distinguish that the accessing user terminal 200 is a smartphone. And when the user agent information is indicating a Web browser for mobile phones or smartphones while the communication carrier information is indicating a communication carrier that handles only mobile phones, the Web server 100 can distinguish that the accessing user terminal 200 is a mobile phone.

When the aforementioned distinguished terminal type is a mobile phone, the Web server 100 reads out screen decoration data for mobile phones from the storage 101 to include in the aforementioned screen definition 125 and generates screen display information in inline CSS style. And when the aforementioned distinguished terminal type is a smartphone, the Web server 100 reads out screen decoration data for smartphones from the storage 101 to include in the aforementioned screen definition 125 and generates screen display information in external CSS file format. As screen decoration data, a CSS (Cascading Style Sheets) data group can be assumed. CSS is a specification that defines display of the markup language represented by HTML.

The screen definition 125 relates to, for example, each screen provided to the user for every predetermined network banking process, and is definition describing fixed information that is to be certainly displayed and allocation configuration of process values and the like sent from the application server 110. This screen definition 125 can be considered to be incorporated in the screen control function of the Web server 100. The screen decoration data is prepared for each type of user terminal 200 and is a collection of screen decoration definitions having described various icons and, size, color, design and the like of screens and the like which are taken into consideration in advance according to the screen size, operation interface and the like for each terminal type. In the present embodiment, such screen decoration data for each terminal type is stored in the custom tag library 130 in the storage 101 as shown in FIG. 1.

Further, programs executed to generate the aforementioned screen display information in the Web server 100 can employ JSP (Java Server Pages) technology. This JSP is technology for actively generating Web pages in the Web server 100 using Java language and sent to the client. A Java program is embedded in an HTML file, the program executed in response to a request from the client and only the process results are sent to the client. The results being in an ordinary HTML format allows Web application construction without incorporating a special function in the Web browser. With the JSP technology, a program once created can be reused by reading into a different file, i.e. by inclusion, the file having a JSP program or HTML statements written therein. Accordingly, the screen decoration data read out from the aforementioned custom tag library 130 can be included in the aforementioned screen definition 125. There are two methods for performing inclusion being "include directive" that performs static inclusion and "include action" that performs active inclusion. Existing technology can be used for such inclusion methods and the like.

The Web server 100 also returns screen display information generated by the aforementioned JSP to the aforementioned user terminal. The user terminal 200 receives this screen display information to display on the screen.

Note that, when the aforementioned distinguished terminal type is a mobile phone or a smartphone, the aforementioned Web server 100 can read out from the storage 101 screen decoration data for mobile phones or smartphones, generate screen display information in external CSS file format and return the aforementioned generated screen display information to the aforementioned user terminal 200. Such aspects can be adopted in a circumstance where the mobile phone assumed to access the Web server 100 is supported by external file format.

- - -First Process Procedure Example- - -

In the following, description will be given with reference to the drawings on the actual procedures taken in the screen generating method in the present embodiment. Various kinds of operation associated with the screen generating method described hereunder are implemented by programs that the aforementioned Web server 100 reads out to memories and the like to be executed. These programs are configured with codes for performing various operations explained hereunder.

Figure 3:
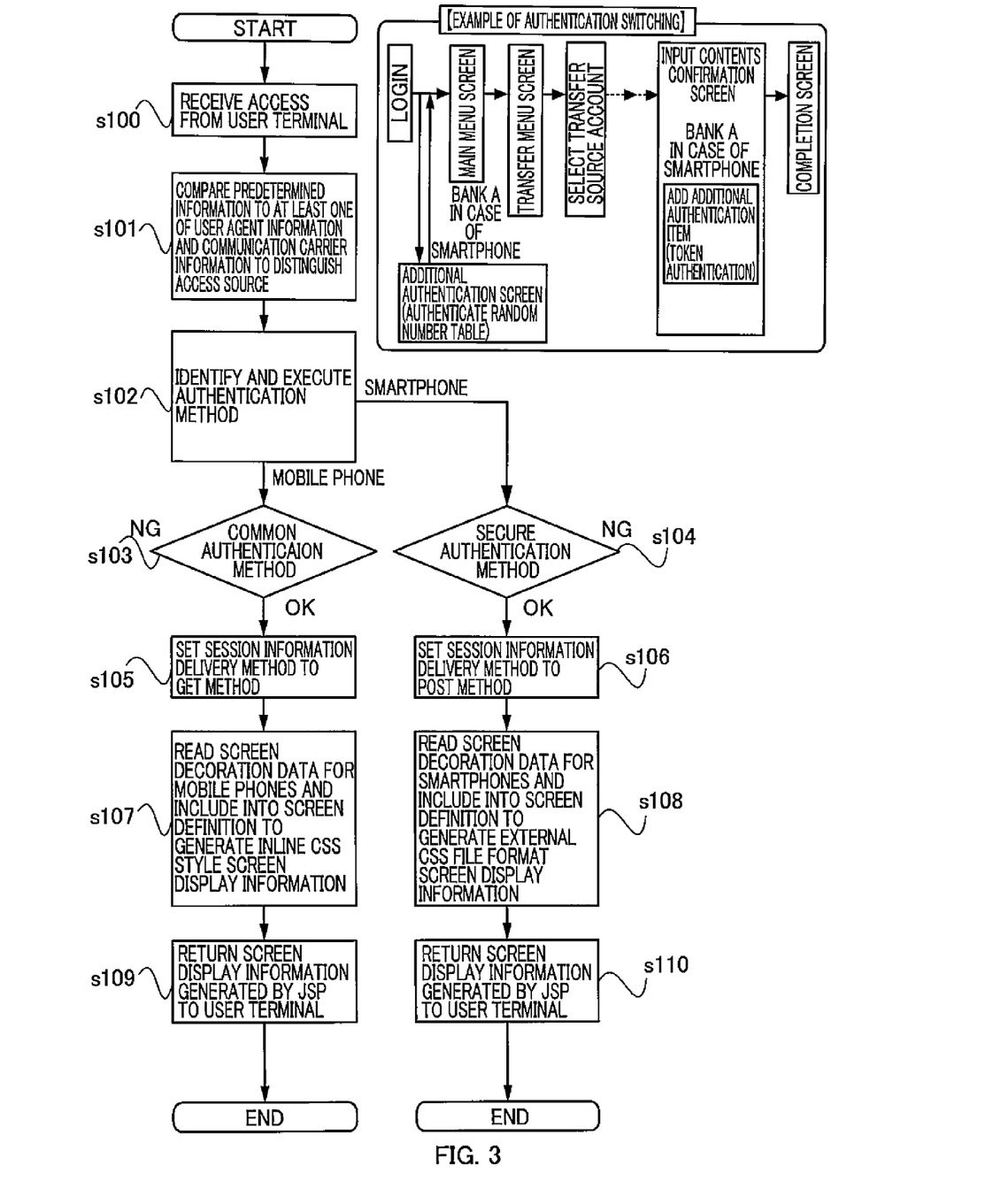
FIG. 3 is a flowchart showing a first process procedure example of the screen generating method in the present embodiment.

FIG. 3 is a flowchart showing the first process procedure example of the screen generating method in the present embodiment. Here, it is assumed that the aforementioned Web server 100 receives an access from the user terminal 200 (s100). In response to this, the Web server 100 compares predetermined information (tables and the like having described therein correspondence relation between agent information or communication carrier information, and user terminal type), and at least one information between user agent information that can be read from the HTTP header sent in response to a request from the user terminal 200 and carrier information used in the access, to distinguish the terminal type of the user terminal 200 being the access source (s101).

For example, when the user agent information indicates a Web browser unique to smartphones, the Web server 100 can distinguish that the accessing user terminal 200 is a smartphone. Whereas when the user agent information indicates a Web browser for mobile phones or smartphones, and the communication carrier information indicates a communication carrier that handles only mobile phones, the Web server 100 can distinguish that the accessing user terminal 200 is a mobile phone. In this way, the Web server 100 stores such distinguished terminal type information in the storage 101 or memory 103 until the session with the corresponding user terminal 200 ends.

Next the Web server 100 refers to the authentication method selection table 126 held in advance in the storage 101, identifies the authentication method corresponding to the terminal type information distinguished at aforementioned step s101 and executes user authentication process by the applicable authentication method (s102). The authentication method selection table 126 becomes the table storing authentication method information set for each type of user terminals 200.

For example, when the accessing user terminal 200 is a mobile phone (s102: MOBILE PHONE), communication will be made through dedicated lines of the communication carrier meaning a secure environment where spoofing from outside and information leakage is difficult to occur and therefore common authentication methods are adopted using, for example, user IDs and passwords as authentication methods (s103). Whereas when the accessing user terminal 200 is a smartphone (s102: SMARTPHONE), communication will be made over the Internet being a public network meaning an environment where there are concerns about spoofing from outside and information leakage unless appropriate measures are taken and therefore authentication methods that require biometric authentication in addition to matching processes of, for example, user IDs and passwords are adopted as the authentication method (s104). An example of the authentication method process switched in such manner is shown in the upper right section of FIG. 3. In this example there is shown a process flow from login through displaying an additional authentication screen (screen where authentication is performed based on a random number table held by the user), main menu screen, and transfer menu screen, selecting transfer source account, displaying input contents confirmation screen (screen where token authentication is performed in addition) and the completion screen.

After successful user authentication at the above-described step (s103: OK, or s104: OK), the aforementioned Web server 100 sets the session information delivery method used during session management to the GET method when the user terminal 200 is a mobile phone (s105) and to the POST method when the user terminal 200 is a smartphone (s106) based on the terminal type information distinguished at aforementioned step s101. When the user terminal 200 is a mobile phone, communication will be made through dedicated lines of the communication carrier as described above, so that the GET method including session information in the URL is acceptable, whereas when the user terminal 200 is a smartphone, communication will be made over the Internet so that the POST method being more secure than the GET method is adopted.

Next, when the aforementioned user terminal 200 is a mobile phone, the Web server 100 reads screen decoration data for mobile phones from the storage 101 to include in the aforementioned screen definition 125 and generates screen display information in inline CSS style (s107). And when the aforementioned distinguished terminal type is a smartphone, the Web server 100 reads screen decoration data for smartphones from the storage 101 to include in the aforementioned screen definition 125 and generates screen display information in external CSS file format (s108). As screen decoration data, a CSS (Cascading Style Sheets) data group can be assumed. CSS is a specification that defines display of the markup language represented by HTML.

The screen definition 125 relates to, for example, each screen provided to the user for every predetermined network banking process, and is definition describing fixed information that is to be certainly displayed and allocation configuration of process values and the like sent from the application server 110. This screen definition 125 can be considered to be incorporated in the screen control function of the Web server 100. The screen decoration data prepared for each type of user terminals 200 is a collection of screen decoration definitions having described various icons and, size, color, design and the like of screens and the like which are taken into consideration in advance according to the screen size, operation interface and the like for each terminal type.

Further, the programs executed to generate the aforementioned screen display information in the Web server 100 can employ the JSP (Java Server Pages) technology. This JSP is technology for actively generating Web pages in the Web server 100 using Java language and sent to the client. A Java program is embedded in an HTML file, the program executed in response to a request from the client and only the process results are sent to the client. The results being in an ordinary HTML format allows Web application construction without incorporating a special function in the Web browser. With the JSP technology, a program once created can be reused by reading into a different file, i.e. by inclusion, the file having a JSP program or HTML statements written therein. Accordingly, the screen decoration data read out from the aforementioned custom tag library 130 can be included in the aforementioned screen definition 125.

The Web server 100 also returns screen display information generated by the aforementioned JSP to the aforementioned user terminal (s109, s110). The user terminal 200 receives this screen display information to be displayed on the screen.

Note that setting of the inline CSS for mobile phones can be changed according to the communication carrier of the mobile phone and for each type of the mobile phone. The external CSS file for smartphones can be changed according to the carrier or the type of the smartphone. Also display information such as the "meta" tag can be changed according to the carrier or type of the mobile phones as well as the carrier or type of the smartphone.

Further, the above-described JSP can be used as a common source for different user terminal types, or may be operated as a separate program based on the same source. Similarly, the screen controller can be shared between user terminals based on the same source as that for the screen for PC browsers. Further, it is a matter of course that the above can be similarly adopted when tablet PCs are used instead of smartphones.

- - -Second Process Procedure Example- - -

Figure 4:
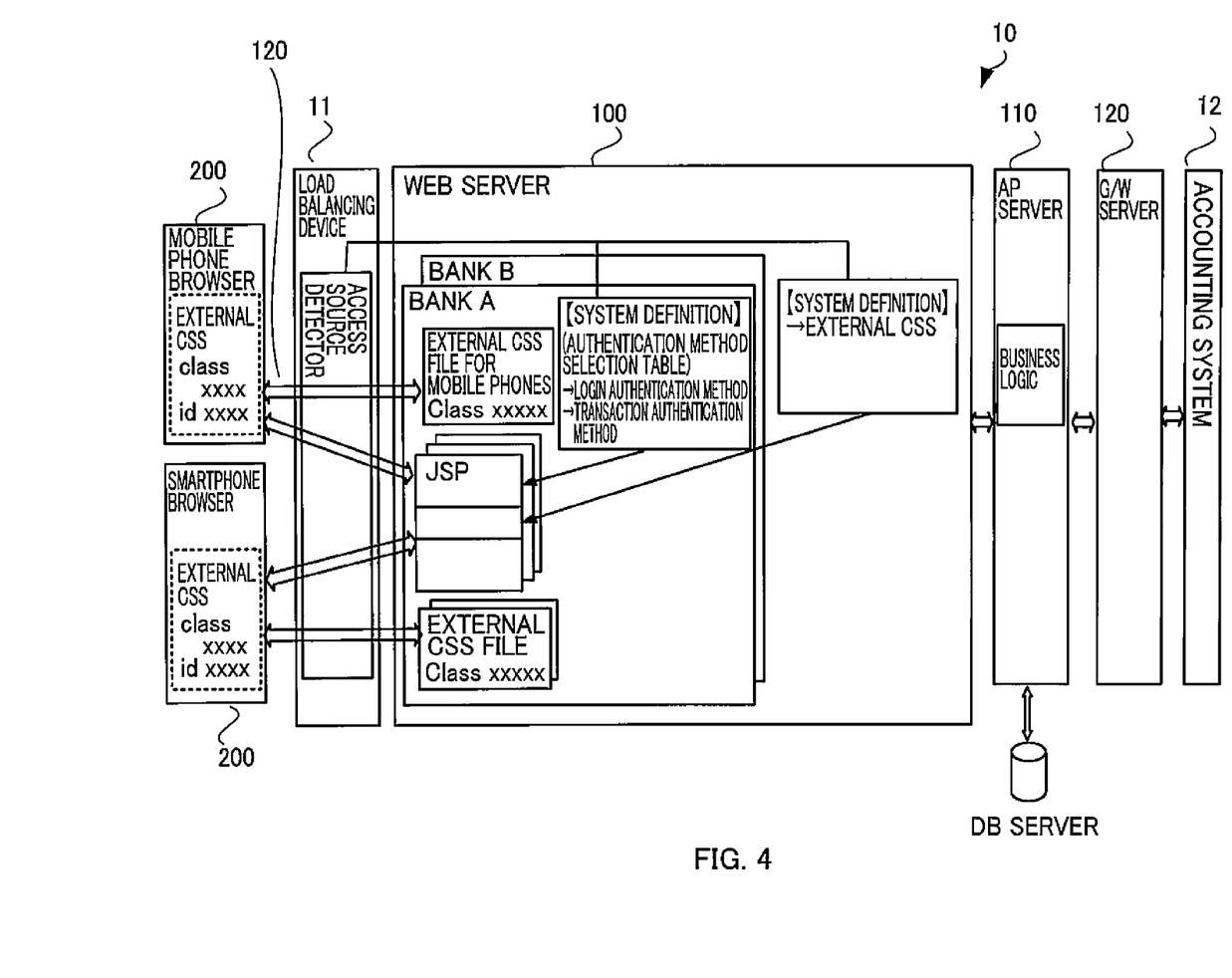
FIG. 4 is a diagram showing another configuration example of the screen generating system.
Figure 5:
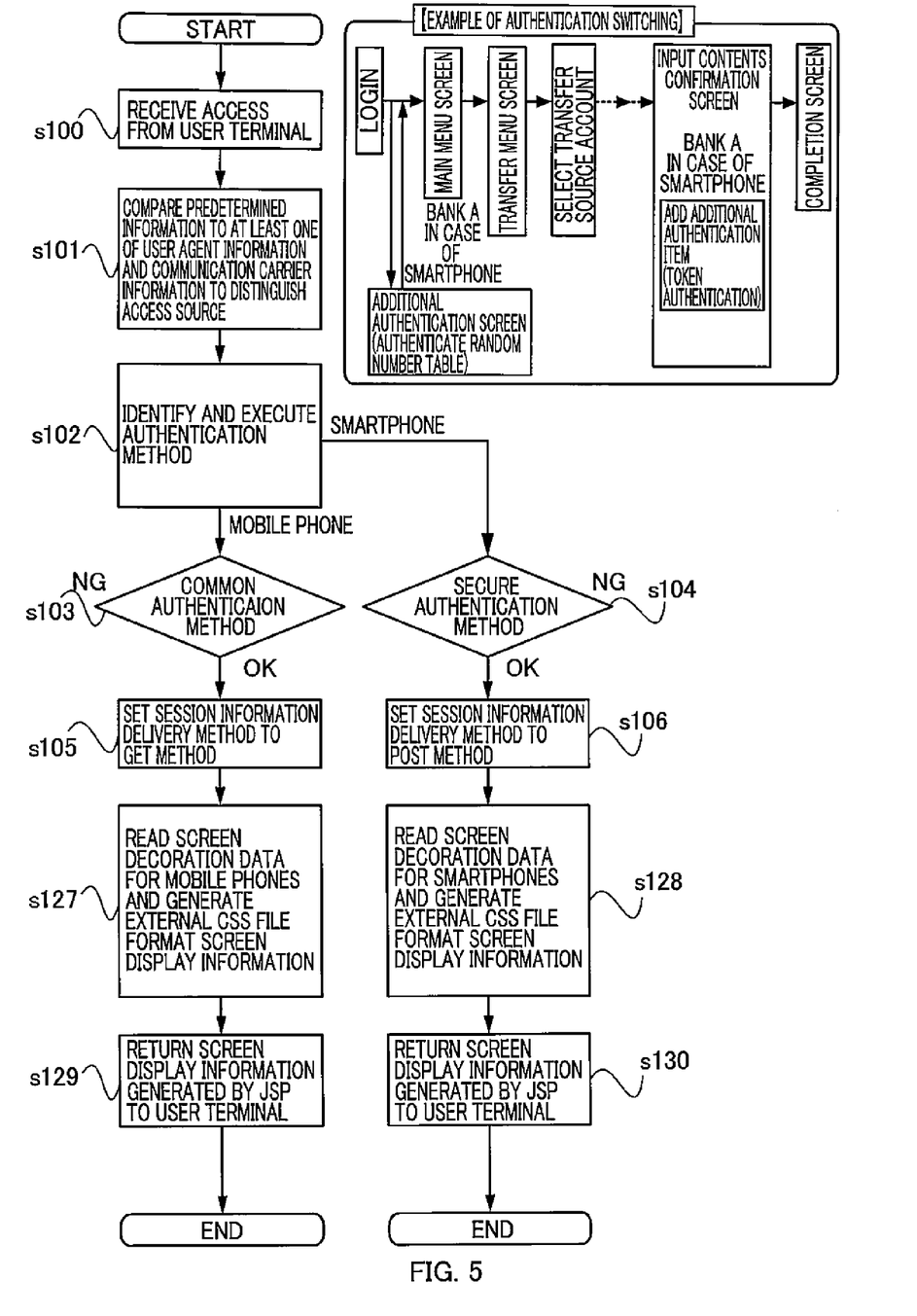
FIG. 5 is a flowchart showing a second process procedure example of the screen generating method in the present embodiment.

Now, process when specification of the mobile phone as the user terminal 200 supports external CSS file format will be explained with reference to the drawings. FIG. 4 is a system configuration diagram corresponding to the particular process procedure example and FIG. 5 is a flowchart showing the second process procedure example of the screen generating method in the present embodiment. In this flow, the processes in steps s100 through s106 are the same as those in the above-described first process procedure example and therefore description thereof will be omitted. Accordingly, description will be given starting from step s107.

In the present case, when the aforementioned user terminal 200 is a mobile phone, the Web server 100 reads screen decoration data for mobile phones from the storage 101 and generates screen display information in external CSS file format (s127). And when the aforementioned distinguished terminal type is a smartphone, the Web server 100 reads screen decoration data for smartphones from the storage 101 and generates screen display information in external CSS file format (s128). The programs executed to generate the aforementioned screen display information in the Web server 100 can employ the JSP (Java Server Pages) technology.

Further, the Web server 100 returns the screen display information generated by the aforementioned JSP to the aforementioned user terminal 200 (s129, s130). The user terminal 200 would receive this screen display information to display on the screen.

Although the best mode and the like for working the present invention has been specifically described above, it is to be understood that the invention is not limited to the embodiments described, and various changes and modifications can be made thereto without departing from the gist of the invention.

According to such embodiments, a screen with favorable usability according to the user's terminal can be provided effectively and at low cost.

At least the following will become apparent from the description of the present specification. That is, when the aforementioned distinguished terminal type is a mobile phone or a smartphone, the aforementioned arithmetic unit in the aforementioned screen generating system can be made to read screen decoration data for mobile phones or smartphones from the storage to generate screen display information in external CSS file format and return the aforementioned generated screen display information to the aforementioned user terminal. Further, it is a matter of course that the above can be similarly employed when a tablet PC is used instead of a smartphone.

Furthermore, in the aforementioned screen display system, the aforementioned storage has stored an authentication method selection table having written therein user authentication method for each different user terminal type and the aforementioned arithmetic unit can be made to refer to the authentication method selection table in the aforementioned storage, identify the authentication method corresponding to the information of the aforementioned distinguished terminal type to execute the user authentication process by the aforementioned authentication method.

Moreover, in the aforementioned screen display system, the session information delivery method used during session management by the aforementioned arithmetic unit can be determined in accordance to the aforementioned distinguished terminal type.

What is claimed is:

1. A screen generating system, comprising:
   a communication unit configured to communicate with a user terminal through a network;
   a storage configured to store at least screen definition data common to various user terminal types, and screen decoration data according to a user terminal type;
   a processing unit configured to distinguish an access source terminal type with at least one information, acquired when accessing from a user terminal, of user agent information relating to the user terminal and communication carrier information used for the accessing;
   a processing unit configured to generate, when the distinguished terminal type is a mobile phone, inline Cascading Style Sheets (CSS) style screen display information by reading screen decoration data for mobile phones from the storage to include in the screen definition and when the distinguished terminal type is a smartphone or a tablet PC, external CSS file format screen display information by reading screen decoration data for smartphones or tablet PCs from the storage to include in the screen definition, and
   an arithmetic unit configured to execute a process that returns the generated screen display information to the user terminal.

2. The screen generating system according to claim 1, wherein
   when the distinguished terminal type is a mobile phone, or a smartphone or a tablet PC, the arithmetic unit is configured to read from the storage screen decoration data for mobile phones or for smartphones, generate screen display information in an external CSS file format, and return the generated screen display information to the user terminal.

3. The screen generating system according to claim 1, wherein
   the storage stores an authentication method selection table having written therein user authentication methods according to the user terminal type, and
   the arithmetic unit is configured to refer to the authentication method selection table in the storage to identify an authentication method corresponding to the distinguished terminal type information, and execute user authentication process by the authentication method.

4. The screen generating system according to claim 1, wherein
   the arithmetic unit is configured to determine a session information delivery method used during session management according to the distinguished terminal type.

5. A method of generating a screen by an information apparatus including a communication unit configured to communicate with a user terminal through a network and a storage configured to store at least screen definition data common to various user terminal types and screen decoration data according to a user terminal type, the method comprising:
   distinguishing an access source terminal type with at least one information, acquired when accessing from a user terminal, of user agent information relating to the user terminal and communication carrier information used for the accessing;
   generating, when the distinguished terminal type is a mobile phone, an inline Cascading Style Sheets (CSS) style screen display information by reading screen decoration data for mobile phones from the storage to include in the screen definition and when the distinguished terminal type is a smartphone or a tablet PC, an external CSS file format screen display information by reading screen decoration data for smartphones or tablet PCs from the storage to include in the screen definition, and
   returning the generated screen display information to the user terminal.

6. A non-transitory computer-readable recording medium storing a program configured to generate a screen by an information apparatus including a communication unit configured to communicate with a user terminal through a network and a storage configured to store at least screen definition data common to various user terminal types and screen decoration data according to a user terminal type, the program being executed by a computer to cause the computer to perform processes comprising:
   a process of distinguishing an access source terminal type with at least one information, acquired when accessing from a user terminal, of user agent information relating to the user terminal and communication carrier information used for the accessing;
   a process of generating, when the distinguished terminal type is a mobile phone, an inline Cascading Style Sheets (CSS) style screen display information by reading screen decoration data for mobile phones from the storage to include in the screen definition and when the distinguished terminal type is a smartphone or a tablet PC, an external CSS file format screen display information by reading screen decoration data for smartphones or tablet PCs from the storage to include in the screen definition; and
   a process of returning the generated screen display information to the user terminal.

* * * * *